Patented June 2, 1942

2,284,772

UNITED STATES PATENT OFFICE 2,284,772

PRODUCTION OF IMPROVED TITANIUM PIGMENTS

George R. Seidel, Baltimore, Md., assignor to E. I. du Pont de Nemours & Company, Wilmington, Del., a corporation of Delaware No Drawing. Application August 30, 1940, Serial No. 354,833

9 Claims. (Cl. 106—300)

This invention relates to a process for the manufacture of improved titanium pigments. More particularly, it relates to the production of titanium oxide pigments which when incorporated in enamel paints of the air-drying and baking types provide enamel films which have excellent color and are weather resistant, non-chalking, non-yellowing, and exhibit excellent gloss and gloss retention characteristics. Still more particularly it relates to the production of hydrated aluminum oxide treated titanium oxide pigments of improved fineness and texture, adapted for direct use through simple mixing in coating compositions, such as enamel, flat, or egg shell types of paints, without prolonged milling in the composition vehicles.

Prior art titanium pigments employed in paints and similar coating compositions chalked and faded badly on exposure to weathering influences and light. Additionally, when employed in interior paints, such as air dried enamel paints or high temperature baked enamel paints, such pigments exhibited a marked tendency towards discoloration or yellowing. Furthermore, when such pigments were formulated in enamel paints of the air-drying or baking types the films thereof applied to wood, metal, oilcloth, linoleum, paper, and the like, tended to exhibit poor gloss characteristics and the films of many of such formulations had an objectionably dull, matte appearance. Moreover said films had poor gloss retention properties, i. e., when exposed to atmospheric conditions for a relatively short period of time they lost whatever gloss they might have had. Furthermore, prior art titanium pigments are deficient in fineness properties. In the preparation of said pigments, aggregates of fine particles are formed during the precipitation step. During subsequent calcination these cement together through compacting or sintering manifesting themselves in the final product as coarse, hard, gritty particles.

Substantial improvements in the art of producing weather resistant and discoloration resistant titanium oxide pigments adapted for use in enamel paints are disclosed, for example, in U. S. Patents 1,368,392, 2,161,975 and 2,187,050.

For example, U. S. Patent 1,368,392 discloses a process whereby titanium oxygen compounds suitable for use as pigments are covered with such substances as the relatively insoluble compounds of aluminum, calcium, lead, zinc, and similar metals. It is stated that the process is preferably carried into effect by treating particles of the titanium compound suspended in water with a solution of a salt or salts of the metal or metals chosen, thoroughly stirring the mixture and subsequently introducing a suitable precipitant, whereby the metal or metals chosen are deposited upon the particles of the titanium compound in a relatively insoluble form. The resultant product is said to be practically stable against the action of heat and light incident to the ordinary use of paint. However, the product of the hereindescribed batch process, when employed in enamel paints of the air-drying and baking types, provides films which are exceptionally poor in durability and weather resistance, possibly because relatively large quantities of soluble salts, e. g., sodium sulfate, are caused to be concurrently formed with the aluminum hydroxide and included therein during the batch precipitation operation. The presence of the soluble salts, which cannot be removed even by prolonged and uneconomical washing, is very objectionable since coating films containing products so treated are exceptionably poor in durability and weather resistance. Furthermore, the product of said process provides enamel paint films which exhibit even poorer gloss characteristics and poorer gloss retention properties than do said pigments prior to treatment.

U. S. Patent 2,161,975 discloses a process whereby a titanium oxide pigment is stirred with a solution of a basic aluminum salt. No alkaline neutralizing or precipitating agent is employed. Said process has as an object the preparation of titanium oxide pigment possessing improved pigment properties, particularly improved resistance to weathering, and possessing increased resistance against the action of light. However, titanium oxide pigments had by said process exhibit poor gloss characteristics and poor gloss retention properties.

The process disclosed by U. S. Patent 2,187,050 comprises effecting the separate precipitation of hydrated aluminum oxide, purifying said hydrated oxide by washing, and thereafter incorporating the same, without drying, in an aqueous suspension of a previously calcined titanium pigment. The process of this patent provides titanium oxide pigments which are substantially free from soluble salts and which are remarkably stable and resistant against weathering, discoloration, chalking, or lack of tint retention. However, when incorporated in enamel paints of the air-drying or baking type they produce films which exhibit even poorer gloss and gloss retention properties than do the corresponding untreated pigments.

It has long been recognized in the art that titanium pigments should be in a relatively finely divided condition to insure the formation of enamel paints capable of producing smooth and glossy paint films when said pigments are milled with paint vehicles. Furthermore, the present tendency on the part of pigment users is to demand pigment materials which are even more finely divided than heretofore and which can be incorporated in a paint vehicle by simple mixing or stirring, as in a pony mixer, to produce a paint which forms films of smooth unbroken surface without any irregularities visible to the naked eye. Titanium pigments manufactured by the aforementioned and other prior art processes do not fulfill this requirement. Said titanium pigments do not possess such uniformity of particle size, texture, and fineness, as to be adapted for direct incorporation by simple mixing in all types of coating compositions.

For a better understanding of the characteristics desired in titanium pigments adapted for use in enamel paints it will be necessary to explain the various terms used herein and the methods of testing employed:

*Mix-in pigment particle size*

The term "mix-in pigment particle size," as employed herein and in the appended claims, refers to the size of the discrete particles and aggregates of a pigment in a paint composition prepared by simple mixing of dried finished pigment and paint vehicle. More particularly, it relates to the number of discrete pigment particles and aggregates of pigment particles in .00025 cubic centimeter of said paint composition, containing 0.1163 per cent of pigment by volume, which are larger than a predetermined size such as 6 microns, 8 microns, or 15 microns in diameter.

To determine mix-in pigment particle size, 500 grams of pigment and approximately 100 grams of a linseed oil vehicle consisting of 52% by weight of "Z" body kettle bodied linseed oil of 11 acid number and 48% by weight of petroleum spirits, as defined by A. S. T. M. Tentative Standard D235-26T issued in 1926, are mixed for 20 minutes in a pony mixer of the type referred to on page 1283 of Perry's "Chemical Engineers' Handbook" (1934). Said mixer is provided with a receptacle or pot 7 inches in diameter and 5 inches deep rotating at the rate of 60 revolutions per minute, the paddles of said mixer rotating in the reverse direction at the rate of 64 revolutions per minute. The actual weight of linseed oil vehicle employed varies with the nature of the pigment being tested. The linseed oil vehicle is added to the 500 grams of pigment in just sufficient amount so that the paste obtained at the end of 20 minutes mixing in the aforementioned pony mixer gives a penetrometer reading of 25 mm. with 150 grams load, when tested according to the procedure outlined on pages 596-597 of the 8th (January, 1937) edition of "Physical and Chemical Examination of Paints, Varnishes, Lacquers and Colors," by Henry A. Gardner, and employing the cone type penetrometer specified for A. S. T. M. Tentative Standard D217-27T, described on pages 930-35 of the "Proceedings of the American Society for Testing Materials," vol. 27, part I (1927). The sides and paddles of the pony mixer are scraped down at the end of 1 minute of mixing time, and again at the end of the 20 minute mixing period. An additional quantity of the aforementioned linseed oil vehicle is then added to the paste in amount sufficient to provide 250 grams of said vehicle in the paste; the mixture is stirred for an additional minute in the pony mixer and is then removed from said mixer. The sample of said mixture is diluted to a concentration of 1.163 cubic centimeter pigment per liter of thinned paint by stirring with an additional amount of the linseed oil vehicle used in the preparation of said paste. The weight in grams of pigment in one liter of the thinned paint will be 1.163 times the specific gravity of the pigment. A sample of the thinned paint so obtained is placed in a 100 micron deep glass cell and examined at 500 diameters magnification using transmitted light from a carbon arc. A pigment, which by this test shows less than 100 particles per 0.00025 cubic centimeter of thinned paint that are larger than $n$ microns in diameter, and not more than one particle that is larger than $n+5$ microns in diameter, is defined as having a mix-in pigment particle size of $n$ microns. It is to be understood that these particles thus observed include both primary particles and aggregates that have not been dispersed in the mixing operation. A pigment which by this test shows less than 100 particles per 0.00025 cc. of thinned paint that are larger than 6 microns in diameter and not more than 1 particle that is larger than 11 microns in diameter, is defined as having a mix-in pigment particle size of 6 microns and may readily be incorporated in a paint vehicle by simple mixing to produce a paint which forms paint films of a perfect mirror-like appearance. A pigment which shows less than 100 particles that are larger than 8 microns and not more than 1 particle larger than 13 microns per 0.00025 cc. is defined as having a mix-in pigment particle size of 8 microns and may readily be incorporated in an enamel paint vehicle by simple mixing to produce an enamel paint which forms a smooth glossy paint film eminently suited for high grade enamel finishes. A pigment which shows less than 100 particles that are larger than 15 microns and not more than 1 particle larger than 20 microns is defined as having a mix-in pigment particle size of 15 microns and is particularly adapted to making flat paints of the interior wall finish type and may readily be incorporated in a paint vehicle by simple mixing to produce a paint which forms films of smooth unbroken surface without any irregularities visible to the naked eye.

It is to be understood that the values for mix-in pigment particle size as herein above determined differ markedly from those for pigment particle size as heretofore determined by prior art testing methods. Mix-in pigment particle size is an actual measure of the fineness of a pigment incorporated in an organic coating composition by simple mixing without milling of said coating composition. On the other hand, prior art pigment particle size measurements give particle size results which in practice are only obtained with difficulty, if at all, after prolonged milling of pigment and coating composition vehicle in such milling devices as pebble mills, paint roller mills, and the like. In preparing the pigment sample for particle size determination by prior art methods, for example, by the Tentative Standard Method B-20-23-T, appearing at pages 989-995 of "American Society for Testing Materials, Proceedings of the Thirty-Sixth Annual Meeting," vol. 33, Part I (1933), the pigment is dispersed in the vehicle on a microscope slide by prolonged and severe rubbing which effects subdivision or removal of all cemented pigment aggregates. In paint manufacturing practice, however, said aggregates are not broken down by simple mixing of pigment and vehicle and, in fact, often persist after prolonged milling of the pigment in the vehicle.

Film particle count

The term "film particle count," as employed herein and in the appended claims, refers to the number of particles and aggregates which appear as objectionable grit in a dried film of a paint composition prepared by simple mixing of a dried finished pigment and a paint vehicle. More particularly, it relates to the number of projections above the surface of said film having diameters of 50 microns or more. It is understood that these projections include both the pigment material and the adhering layer of vehicle; probably not more than half of the diameter of the protruding particle is due to the pigment.

A suitable method for determining film particle count comprises mixing 500 grams pigment and sufficient vehicle consisting of 75% by weight "Z" body kettle bodied linseed oil of 11 acid number, and 25% by weight petroleum spirits as defined by A. S. T. M. Tentative Standard D235-26T issued 1926, to provide a pigment-vehicle mixture comprising 35.7% pigment by volume to 64.3% vehicle by volume, for 20 minutes in a pony mixer, such as set forth at page 1283 of Perry's 1934 "Chemical Engineers' Handbook," and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6 inches in diameter and with 0.003 inch clearance between said rolls. The first roll in said mill rotates at a speed of 21 revolutions per minute; the second at 63 revolutions per minute; and the third at 189 revolutions per minute. Passage of said mixture through the paint roller mill set with such wide clearance between the rolls effects little if any grinding of the pigment material, but does insure thorough and reproducible mixing of the pigment and vehicle. A 300 gram sample of the resultant mixed paint is diluted with more of the linseed oil petroleum spirits vehicle to provide a paint consisting of 17.6 pigment by volume and 82.4% of said vehicle by volume. Petroleum spirits are then added with stirring in sufficient amount to produce a paint having a consistency of 5.0N, as determined by the modified Stormer viscometer test described on pages 1272-77 of Perry's "Chemical Engineers' Handbook" (1934). The resultant paint is allowed to stand 20 hours, after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18° 26' 12", using a high intensity microscope lamp, and the number of projections, noted per 10 square centimeter of paint film, above the surface of said film having diameters of 50 microns or more, are counted. The numerical figure thereby obtained is defined as "film particle count."

Texture

Texture may be defined as the hardness, shape and size of the individual pigment particles, and directly influences the type of paint or coating composition film which will be obtained when a pigment is milled in a given formulation, i. e., whether the film will be rough or smooth. An efficient test for determining texture and fineness of pigments comprises that outlined in "Physical and Chemical Examination of Paints, Varnishes, Lacquers and Colors," by Henry A. Gardner, 8th edition, pp. 511-512, January 1937. Briefly, this is as follows:

Using a spatula with a flexible blade (1½ by 6½ inches), the pigment is mixed with a quick drying varnish of fairly good wetting properties. The amount of pigment and varnish varies with the nature of the pigment. For titanium dioxide about 1.5 grams of pigment and 1.8 cubic centimeters of varnish is used. The paste is given 50 double rubs using strokes about 12 inches long. The paste is collected and respread after each 10 rubs. A wedgeshaped film is made on the glass by drawing a 3½ inch doctor blade, one end of which is resting on a steel strip 0.003 inch thick, over the paint. The film is allowed to dry in a dust-free atmosphere and is then examined under illumination at grazing incidence using a high intensity microscope lamp. Grading is most conveniently done against standards and is based on the size and number of coarse particles projecting from the thin portion of the wedge film.

The value for texture thus obtained is a measure of the number of particles of the order of 10 microns, and may be defined by means of an arbitrary scale. The standards used range from "1" at the bottom of the scale (representing a film containing a large number of 10 micron particles and with a sand-like appearance), to "17" at the top of the scale (representing perfect texture properties and a film having a smooth and glass-like appearance, with practically no perceptible coarse particles.) The intermediate standards represent gradual and evenly spaced graduations from one extreme to the other, a difference of one point being material in the scale.

Paint grit

The values for paint grit herein were determined by a convenient and practical test for the semi-quantitative determination of coarse particles, comprising mixing 200 grams of pigment with 108 grams of a quick drying varnish. The resultant paste is passed once through a roll mill with the rolls set 0.0015 inch apart. Steel strips are used for setting the mill and are withdrawn before grinding. The ground paste is reduced to paint consistency by addition of 82 grams of the varnish to 265 grams of the paste and is allowed to stand 16 hours. A uniform film of the paint is made on glass by drawing over the paint a 3½ inch doctor blade, both ends of which are resting on steel strips 0.0015 inch thick. The film is allowed to dry in a dustfree atmosphere and is then examined under illumination at grazing incidence, using a high intensity microscope lamp, and compared for film fineness and for the presence of coarse gritty aggregates against a set of arbitrary standards.

The value for paint grit thus obtained is a measure of the number and size of particles protruding above the surface of the film, and is especially a measure of the quantity of grit particles above a size of 40 microns. The standards used range from "1" at the bottom of the scale (representing a film with extremely coarse particles and sand-like in appearance), to "18" at the top of the scale (representing perfect grit value and a film which is smooth and glasslike in appearance, with substantially no perceptible coarse particles). The intermediate standards represent gradual and evenly spaced graduations from one extreme to the other, a difference of one point being material in the scale.

*Gloss*

Gloss is the ability of a surface to reflect light regularly. It is determined on the Lange photoelectric gloss meter by the method described at pages 247–248 of the Dr. St. John's translation of Dr. Lange's "Photo-Elements and Their Application," published in 1938 by Reinhold Publishing Corporation, the deflection of the needle of said gloss meter being adjusted to read 100 for a standard sample of polished black glass.

Having defined certain descriptive terminology which is employed for a more complete understanding of this invention, a detailed description of said invention will now be given.

This invention has as an object the production of improved titanium pigments. A further object is the production of improved titanium oxide pigments which pigments when employed in enamel paints of the air-drying and baking types will provide enamel films which will manifest superior color and superior tint retention, will be highly resistant towards yellowing and chalking, and will exhibit high gloss and excellent gloss retention characteristics. A still further object is the production of mix-in titanium pigments which are free from objectionable aggregates or gritty particles and will possess such superior fineness and texture characteristics as to be adapted for direct use by simple mixing in all types of coating composition vehicles, especially in enamel paints. Additional objects will become apparent from an examination of the following description and claims.

These objects are obtained according to the hereindescribed invention which broadly comprises simultaneously and separately introducing into a reaction vessel a titanium pigment suspension, a water soluble aluminum compound, and a precipitant for said aluminum compound, maintaining the concentration of titanium pigment in said mixture in the range of from about 10 to about 350 grams pigment per liter, maintaining the hydrated aluminum oxide concentration in said mixture in the range of about 0.05% to about 10% calculated as $Al_2O_3$ and based upon the weight of the pigment, maintaining a substantially constant pH in said mixture in the range of from about 5 to about 8.5, and withdrawing the reaction mixture from the reaction vessel.

In a more restricted sense this invention comprises simultaneously and continuously introducing into a precipitating tank a dispersed aqueous titanium oxide pigment suspension, a water soluble aluminum salt, and a water soluble basic precipitant therefor while maintaining a substantially constant volume of the resultant reaction mixture in said precipitating tank, maintaining the concentration of titanium oxide pigment in said mixture at a substantially constant value in the range of from about 150 to about 250 grams pigment per liter, maintaining the hydrated aluminum oxide concentration in said mixture at a substantially constant value in the range of from about 0.1% to about 2% calculated as $Al_2O_3$ and based upon the weight of the pigment, maintaining a substantially constant pH in said mixture in the range of from about 5 to about 7.4, continuously withdrawing the reaction mixture from the precipitating tank, and thereafter dewatering and washing said reaction mixture, drying the resultant treated titanium oxide pigment at a temperature of not more than about 200° C., and subsequently dry milling the treated pigment.

A preferred embodiment of this invention comprises simultaneously and continuously introducing into a precipitating tank an alkaline reacting dispersed aqueous pigment titanium oxide suspension, an aqueous aluminum sulfate solution, and an aqueous sodium carbonate solution, while maintaining a substantially constant volume of the resultant reaction mixture in said precipitating tank, maintaining the concentration of the pigment titanium oxide in said mixture at a substantially constant value in the range of from about 175 to about 225 grams pigment per liter, maintaining the hydrated aluminum oxide concentration in said mixture at a substantially constant value in the range of from about 0.25% to about 1% calculated as $Al_2O_3$ and based upon the weight of the pigment, maintaining a substantially constant pH in said mixture in the range of from about 5 to about 6, continuously withdrawing the reaction mixture from the precipitating tank, filtering off and washing the resultant treated pigment, drying at a temperature of not more than about 115° C., and thereafter dry-grinding the dried treated pigment.

Various arrangements and selections of equipment for the operation of my process are possible. In the preferred arrangement, however, I feed an aqueous suspension of calcined unground pigment titanium dioxide, containing about 175 grams pigment per liter and sodium hydroxide in amount sufficient to provide a pH of about 9.6 in the suspension, to a continuous ball or tube mill which is fed by either a tube extending into the end of the mill or by a scoop feeder. In passing through the mill the product is ground and the mill discharge is fed continuously into a hydroseparator or other pigment slurry classifier. The fines are overflowed at a rate such that substantially all particles having a diameter in excess of 6 microns settle out and are returned to the ball mill. The overflow fraction, which is substantially free from pigment particles having diameters in excess of 6 microns, comprises about 175 grams pigment per liter, has a pH of about 9.6 and is in a well dispersed condition, is fed to an agitated mixing tank continuously and at a substantially constant rate. At the same time solutions of aluminum sulfate and sodium carbonate are introduced into said mixing tank at separated points and at substantially constant rates. The aluminum sulfate solution is added in an amount equivalent to about 1.0% calculated as $Al_2O_3$ and based upon the pigment weight while the sodium carbonate solution is added at a substantially constant rate in an amount sufficient to maintain a pH of about 5.5 in the mixing tank. Under these conditions the aluminum sulfate is precipitated in the form of hydrated aluminum oxide on the surface of the titanium pigment particles and the titanium pigment dispersion is coagulated. The pigment suspension is stirred continuously, its level in the mixing tank being always kept at a constant point, nearly tank full, and the treated pigment slurry withdrawn continuously at a substantially constant rate and conducted to a settling tank. The pigment settles rapidly in said tank to form a slurry containing about 2 parts water to one part pigment. This slurry is filtered, washed, reslurried with water, adjusted to a pH of about 8 by addition thereto of ammonium hydroxide solution, is then refiltered, dried at a temperature of about 105° C., and dry milled after which it is ready for use.

The following examples are given for illustrative purposes and are not intended to place any restrictions or limitations on the hereindescribed invention.

Example I

An aqueous slurry of calcined wet milled dispersed pigment titanium dioxide substantially free from pigment particles having diameters in excess of 5 microns and containing 175 grams titanium dioxide per liter and sodium hydroxide in amount sufficient to provide a pH of 9.6 was fed into a reaction tank at the rate of 153 parts $TiO_2$ per minute. Concurrently a solution of aluminum sulfate containing 312 grams $Al_2(SO_4)_3 \cdot 18H_2O$ per liter was introduced into said reaction tank at a rate of ten parts $Al_2(SO_4)_3 \cdot 18H_2O$ per minute, i. e., the aluminum sulfate solution was introduced at a rate equivalent to one per cent calculated as $Al_2O_3$ and based upon the weight of the pigment. Simultaneously a solution of sodium carbonate was introduced into said reaction tank at a substantially constant rate such that the pH therein was maintained at substantially 8, thereby effecting precipitation of the aluminum sulfate as hydrated aluminum oxide upon the titanium dioxide pigment particles. The contents of the reaction tank were agitated vigorously and continuously and the resultant hydrated aluminum oxide coated coagulated titanium dioxide pigment slurry was drawn off continuously from said tank at a substantially constant rate. Said slurry was allowed to settle, the supernatant liquor was decanted therefrom, and the resultant thickened slurry was filtered, washed to a soluble salt content of less than 0.05% on the basis of the pigment weight, dried at a temperature of 103° C., and dry milled. The product thereby obtained according to my invention was designated as pigment A.

Example II

The process of Example I was duplicated except that the solution of sodium carbonate was introduced into the reaction tank at a substantially constant rate such that the pH therein was maintained at substantially 5.5 rather than substantially 8. Furthermore, the filtered and washed treated pigment prepared by this process was slurried in water, adjusted to a pH of 8 by solution of ammonium hydroxide, and filtered prior to the drying operation. The product thus obtained according to my novel process was designated as pigment B.

Example III

The process of Example I was duplicated except that a solution of sodium hydroxide rather than a solution of sodium carbonate was introduced into the reaction tank at a substantially constant rate such that the pH therein was maintained at substantially 8. The product thus obtained by my novel process was designated as pigment C.

Example IV

Following the teachings of U. S. Patent 1,368,392, a sample of the pigment titanium dioxide dispersion employed in the process of Example I was placed in a vat and stirred continuously. A solution of aluminum sulfate in amount equivalent to 2.5% calculated as aluminum oxide and based upon the weight was added to the contents of the vat. After thorough mixing, a solution of sodium carbonate was added in quantity sufficient to precipitate the aluminum in the form of a hydroxide. Agitation was continued until the precipitation was complete. The solid particles were allowed to settle and the supernatant liquid was drawn off. The precipitate, which comprised the titanium dioxide now covered with aluminum hydroxide, was thoroughly washed and was dried and dry milled as was pigment A. The product thereby obtained according to prior art practice was designated as pigment D.

Example V

Following the teachings of U. S. Patent 2,187,050, 15 parts by weight of $Al_2(SO_4)_3 \cdot 18H_2O$ was dissolved in approximately 250 parts by weight of water. Dilute ammonium hydroxide was then slowly added with good agitation until the slurry had a pH of about 7.0 to 7.2. The precipitated hydrated aluminum oxide was then washed by decantation and by filtering to remove soluble salts. The wet precipitate was then reslurried in sufficient water to give a total amount of about 250 parts by weight. This suspension was then added to a coagulated sample of the pigment titanium dioxide slurry employed in the process of Example I, said slurry containing 230 parts by weight of titanium oxide. The pigment slurry was then filtered and the pigment dried and dry milled as was pigment A. The product thereby obtained according to prior art practice was designated as pigment E.

Example VI

A sample of the aqueous slurry of calcined wet milled dispersed pigment titanium dioxide employed in the process of Example I was coagulated by addition thereto of sulfuric acid in amount sufficient to acidify the suspension to a pH of about 4 as disclosed in U. S. Patent 1,937,037. The coagulated slurry was allowed to settle, the supernatant liquor was decanted therefrom, and the resultant thickened slurry was filtered, dried, and dry milled as was pigment A. The product thereby obtained according to prior art practice was designated as pigment F.

Example VII

The process of Example II was duplicated except that dry milling of the pigment product was effected by passing it through a ring roll mill equipped with an air separation system and a rotary hammer mill in series. The product thereby obtained according to my invention was designated as pigment G.

Example VIII

The process of Example IV was duplicated except that dry milling of the pigment product was effected as in Example VII. The product thus obtained according to prior art practice was designated as pigment H.

Example IX

The process of Example V was duplicated except that the pigment product was dry milled as in Example VII. The product thus had according to prior art practice was designated as pigment I.

Example X

The process of Example VI was duplicated except that the pigment product was dry milled as in Example VII. The product thus obtained according to prior art practice was designated as pigment J.

Portions of pigments A to J were tested for mix-in pigment particle size, film particle count, texture, and paint grit. Furthermore, portions of pigments A to J and of two standard titanium dioxide pigments were formulated according to standard enamel paint manufacturing practice and under identical conditions in a drying oil modified polyhydric alcohol polybasic acid resin baking enamel paint formulation, pigmentation being in the proportion of 100 parts by weight of titanium dioxide pigment to 100 parts by weight of vehicle solids. The resultant enamel paints were applied to metal panels under identical conditions and the coated panels were baked for a period of 1¼ hours at a temperature of 180° C. after which the baked films were graded for baking discoloration. The films containing the two standard titanium dioxide pigments were arbitrarily given baking discoloration gradings of "3" and "17." The first gave very definite discoloration on baking under the selected conditions and the pigment was considered too poor for use in such formulations due to its tendency to become yellow under these conditions. The "17" standard represented pigments having sufficiently good baking discoloration properties for use in medium quality enamels. The films containing the titanium dioxide pigments A to J were graded against these standards. The aforementioned films were also tested for gloss immediately after baking and again after exposure for one month to north light. One set of the baked enamel paint coated panels prepared as hereinbefore described was exposed to the elements for one month on a vertical test fence facing south, and were examined for yellowing and chalking at the end of two weeks and at the end of one month's exposure. The numerical values obtained for mix-in pigment particle size, film particle count, texture, paint grit, gloss, and baking discoloration, and the chalking and the yellowing gradings of the films exposed on the fence are recorded in the following table:

Table

| Pigment | Per cent Al₂O₃ on pigment | Mix-in pigment particle size | Film particle count | Texture | Paint grit | Baking discoloration | Gloss Immediate | Gloss After exposure for one month | Exposure on Delaware fence Two weeks Yellowing | Two weeks Chalking | One month Yellowing | One month Chalking |
|---|---|---|---|---|---|---|---|---|---|---|---|---|
| A | 1.0 | 7 | 35 | 16 | 17 | 23 | 98 | 80 | None | None | Very slight | Very slight. |
| B | 1.0 | 4 | 5 | 17 | 18 | 17 | 98 | 79 | Very slight | Very slight | Slight | Slight. |
| C | 1.0 | 8 | 40 | 15 | 16 | 19 | 95 | 70 | None | None | Very slight | Do. |
| D | 2.5 | 25 | 230 | 12 | 10 | 17 | 55 | 22 | Slight | Slight | Appreciable | Considerable. |
| E | 1.0 | 18 | 125 | 14 | 13 | 17 | 70 | 40 | ---do--- | Very slight | ---do--- | Appreciable. |
| F | None | 16 | 70 | 14 | 13 | 3 | 90 | 55 | Considerable | Appreciable | Very bad | Bad. |
| G | 1.0 | 10 | 50 | 16 | 17 | 17 | 98 | 77 | Very slight | Very slight | Slight | Slight. |
| H | 2.5 | 28 | 290 | 11 | 8 | 17 | 55 | 22 | Slight | Slight | Appreciable | Considerable. |
| I | 1.0 | 19 | 175 | 13 | 11 | 17 | 65 | 38 | ---do--- | Very slight | ---do--- | Appreciable. |
| J | None | 18 | 95 | 13 | 11 | 3 | 85 | 50 | Considerable | Appreciable | Very bad | Bad. |

It will be noted that the pigments which were prepared according to prior art practice and were not treated with hydrated aluminum oxide, viz.: pigments F and J, were not acceptable mix-in pigments, having poor mix-in pigment particle size, film particle count, texture, and paint grit properties. While said pigments produced enamel films which had fair gloss properties said films discolored very badly on baking and had little resistance against yellowing and chalking.

The pigments which were treated with hydrated aluminum oxide according to the teachings of U. S. Patent 1,368,392, viz.: pigments D and H, had much poorer mix-in properties than the aforementioned untreated pigments, having very poor mix-in pigment particle size, film particle count, texture, and paint grit properties. While said pigments produced enamel films which had good resistance against baking discoloration and moderate resistance against yellowing, said films chalked considerably and had extremely poor gloss characteristics.

The pigments which were treated with hydrated aluminum oxide according to the teachings of U. S. Patent 2,187,050, viz.: pigments E and I, produced enamel films which had good baking discoloration properties and good resistance against yellowing and chalking, but they had poor gloss characteristics. Furthermore, they were not acceptable mix-in pigments, having poor mix-in pigment particle size, film particle count, texture, and paint grit properties.

The pigments which were prepared according to my novel process, viz.: pigments A, B, C, and G, possessed a unique combination of properties. They had excellent fineness properties and when formulated in enamel paint films they not only produced films which had good baking discoloration properties and good resistance against yellowing and chalking but, furthermore, said films had excellent gloss properties. Pigment A, on which the hydrated aluminum oxide was precipitated by the action of sodium carbonate at a pH of 8 and which was dry-milled, produced films having high resistance to baking discoloration, yellowing, and chalking, and which had manifestly superior gloss and gloss retention properties. Furthermore, said pigment had excellent texture and paint grit characteristics and good mix-in properties. Pigment B, prepared as was pigment A except that the hydrated aluminum oxide was precipitated at a pH of 5.5, produced high quality enamel paints when simply stirred into paint vehicles, had maximum mix-in pigment particle size, film particle count, texture, and paint grit properties, and when formulated in enamel paints produced films which had good resistance against baking discoloration, yellowing, and chalking, and excellent gloss properties. Pigment C, produced as was pigment A except that the hydrated aluminum oxide was precipitated by sodium hydroxide instead of sodium carbonate, was only slightly inferior to pigment A in fineness and mix-in properties, produced enamel films which were substantially equal in yellowing and chalking resistance to those had with pigment A, and were only slightly inferior to gloss properties. Pigment G, produced as was pigment B except that dry milling of the pigment was effected in a ring roll mill equipped with an air separation system and a rotary hammer mill in series, produced enamel films comparable in baking discoloration, yellowing, chalking, and gloss characteristics to those had with pigment B, and was only slightly poorer than pigment B in texture, grit and mix-in properties.

It is to be understood that the herein described specific embodiments of my invention may be subjected to variation and modification without departing from the scope thereof. For instance, while I prefer in my process to employ aluminum sulfate, and more particularly octadecahydrated aluminum sulfate, $Al_2(SO_4)_3 \cdot 18H_2O$, I may employ any water soluble aluminum compound. By the term "water soluble aluminum compound" as employed herein and in the appended claims are included water soluble aluminum salts and water soluble aluminates. Examples of water soluble aluminum salts useful in this invention are aluminum ammonium chloride, aluminum ammonim sulfate, aluminum bromate, aluminum bromide, aluminum chlorate, aluminum chloride, aluminum iodide, aluminum nitrate, aluminum sodium chloride, aluminum sodium sulfate, aluminum sulfate, aluminum acetate, basic aluminum acetate, aluminum ethoxide, aluminum lactate, aluminum 1-phenol-4-sulfonate, aluminum potassium tartrate, and the like. Among examples of water soluble aluminates adapted for use in this invention may be included sodium aluminate, potassium aluminate, barium aluminate, and the like.

Appreciable effects are had when the aluminum compound is employed in an amount equivalent to from about 0.05% to about 10% calculated as $Al_2O_3$ and based upon the weight of the pigment. For most ordinary purposes however I prefer to add the aluminum compound in an amount equivalent to from about 0.1% to about 2% calculated as $Al_2O_3$ and based upon the pigment weight while optimum results are had when the aluminum compound employed, particularly aluminum sulfate, is admixed with the titanium pigment in an amount in the range of from about 0.25% to about 1% calculated as $Al_2O_3$ and based upon the pigment weight.

As hereinbefore stated, hydrated aluminum oxide is precipitated on the pigment particles by adding a precipitant for the aluminum compound concurrently with said aluminum compound. As will be obvious to those skilled in the art the precipitant added must be acidic or acid reacting when the aluminum compound employed is an aluminate, whereas, when the aluminum compound employed is an aluminum salt, the precipitant must be basic or alkaline reacting. Hence, the term "precipitant for the aluminum compound" as used herein and in the appended claims includes acid reacting and alkaline reacting compounds. Suitable acid reacting compounds, adapted for precipitating hydrated aluminum oxide from water soluble aluminates, are water soluble mineral and organic acids and acid salts having an acidic reaction. Examples of suitable acidic substances include sulfuric acid, hydrochloric acid, nitric acid, acetic acid, and such acidic salts as aluminum chloride, aluminum sulfate, and the like, and admixtures thereof. Alkaline reacting compounds, adapted for precipitating hydrated aluminum oxide from water soluble aluminum salts, which are contemplated for use in the invention include alkali and alkaline earth metal compounds, including ammonium compounds, which react with aqueous solutions of aluminum salts to form hydrated oxides. Examples of such compounds include the oxides, hydroxides, carbonates, and bicarbonates of ammonium, sodium, potassium, calcium, strontium, barium, and the like, and admixtures thereof. However, it is to be understood that superior results are had when the alkaline reacting compound employed is water-soluble while optimum results are obtained when said alkaline reacting compound is a water soluble carbonate or bicarbonate of an alkali metal, particularly sodium carbonate.

The titanium pigment slurry and the aluminum compound are added concurrently to the mixing tank or reaction vessel at a substantially constant rate. Likewise, the precipitant for the aluminum compound is added to said tank or vessel at a substantially constant rate, said rate being such that the pH of the reaction mixture in said tank or vessel is maintained at a substantially constant value in the range of from about 5 to about 8.5. It is essential that a substantially constant pH value should be maintained since I have discovered that relatively minor variations in pH values therein affect tremendously the properties of the finished pigment. As hereinbefore stated a substantially constant value in the range of from about 5 to about 8.5 must be maintained. Optimum resistance to weathering, chalking, and yellowing or other discoloration, and excellent gloss and gloss retention properties are had when said pH is maintained in the range of about 7.5 to about 8.5. On the other hand optimum fineness, mix-in pigment particle size, film particle count, texture, and grit properties and excellent resistance to weathering, chalking, yellowing, and other discoloration, and excellent gloss and gloss retention characteristics are had when said pH is maintained in the range of from about 5 to about 6. When said pH is maintained in the range of from about 6.1 to about 7.4 the resultant pigment has excellent gloss characteristics and excellent resistance to weathering, chalking, yellowing and other discoloration and also excellent texture and grit properties.

The titanium pigment slurry treated according to the hereindescribed invention may be either coagulated or dispersed. However markedly superior results are had when said slurry is dispersed. It is to be understood that by the term "dispersed suspension" as employed herein and in the appended claims is meant a pigment suspension which exhibits the Brownian movement. Furthermore it is preferred that said dispersed pigment suspension should be alkaline, the alkalinity of said slurry should be above a pH of 7.2 and preferably between about 8 to about 10. While the herein described process is adapted to the treatment of aqueous slurries of titanium pigments comprising primary pigment particles of all sizes, it is to be understood that optimum benefits are only obtained when said aqueous slurries are substantially free from primary pigment particles having diameters in excess of about 15 microns. In the manufacture of titanium pigments adapted for use in enamel paints it is essential that the aqueous slurry employed should be substantially free from pigment particles having diameters in excess of about 8 microns, while highest gloss is had when said slurry is substantially free from pigment particles having diameters in excess of about 6 microns.

The concentration of the titanium pigment slurry employed may be varied over very wide limits in the range of from about 10 to about 350 grams pigment per liter of slurry. However I prefer, on account of the superior results thereby obtained, to employ slurries having a substantially constant concentration in the range of from about 150 to 250 grams pigment per liter, and for optimum effects I employ slurries having a substantially constant concentration in the range of from about 175 to about 225 grams pigment per liter.

As hereinbefore stated the treated pigment slurry, which is coagulated by the treatment, is dewatered as by filtering and is then washed to a water soluble salt content of less than about 0.25% and preferably less than about 0.05% on the basis of the pigment weight. Subsequently the pH of the washed treated pigment is adjusted to a pH of at least 7 and preferably at least about 8 if the pH of said pigment is less than these values. Said adjustment is effected most readily by slurrying the washed treated pigment in water and adding an alkaline reacting compound, preferably ammonium hydroxide, in amount sufficient to raise the pH of the resultant slurry to a value of at least about 7 and preferably to a value of not less than about 8, after which the pigment slurry is dewatered, as by filtering.

It is essential that the titanium pigment should be dried but it must not be calcined after being treated as aforesaid by my novel process. A pigment providing improved gloss characteristics in enamel paints is not obtained if the pigment is dried at a temperature in excess of about 175° C. Improved results are obtained when the pigment is dried at a temperature of not more than about 140° C., while optimum effects are had when said drying temperature does not exceed about 115° C.

Preferably, the pigment is dry milled after drying. Said milling may suitably be effected in pulverizing mills such as ring roll mills, edge runner mills, pebble mills, buhrstone mills, and the like, or in disintegrating mills, such as rotary hammer mills, squirrel cage disintegrators, and the like, or by passing the dried pigment through a pulverizing mill, preferably a ring roll mill equipped with an air separation system, and then through a disintegrating mill, such as a rotary hammer mill, in series.

While this invention has been described with particular application to the treatment of pigment titanium dioxide, the treatment of other types of titanium pigments is included herein. Accordingly, the term "titanium pigment" as employed herein and in the appended claims includes not only titanium dioxide but also titanium oxide pigments such as metal titanates (particularly those of magnesium, barium, zinc, etc.) as well as titanium oxide extended with such materials as anhydrite, gypsum, barium sulfate, calcium carbonate, calcium sulfite, barium carbonate, silica, aluminum silicate, magnesium fluoride, sodium fluoride, aluminum fluoride, sodium fluosilicate, sodium aluminum fluoride, magnesium fluosilicate, pachnolite, calcium fluoride, and the like. It is further to be understood that the titanium oxide compounds employed in my invention shall have had their pigment properties developed by calcination or other treatment, as by the process of U. S. Patent 1,892,693, and preferably shall have been wet milled, as by the process of U. S. Patent 1,937,037, prior to treatment by my novel process.

My process possesses advantages not previously combined in a single process. Furthermore, the products of my process possess advantages not previously combined in titanium pigments. Said products when employed in enamel paints of the air-drying and baking types provide films which not only manifest excellent color, superior tint retention, and high resistance towards yellowing and chalking but also exhibit excellent gloss and gloss retention characteristics and superior fineness properties. Furthermore, the product had when precipitation of the hydrated aluminum oxide on the titanium pigment particles is effected at a pH in the range of from about 7.5 to about 8.5, when employed in enamel paints of the air drying and baking types, provides films having hitherto unrealized high tint retention and resistance towards yellowing and chalking. Furthermore, said product provides films which exhibit excellent gloss and gloss retention characteristics. Again, the product of my novel process, obtained when the precipitation of the hydrated aluminum oxide on the titanium pigment is effected at a pH in the range of from about 5 to about 6 has superior tint retention, high resistance towards yellowing and chalking, and exhibits excellent gloss and gloss retention characteristics, and in addition has optimum mix-in properties. The ready adaptability to direct mix-in which titanium pigments treated in accordance with this invention affords will be evident at once upon evaluating and testing such treated substances in accordance with the mix-in pigment particle size and film particle count tests referred to. Prior art titanium pigments exhibit mix-in pigment particle size values in excess of substantially 20 microns and film particle count values ranging from about 100 to in excess of 200. In order to render such pigment materials useful in paint compositions they must be milled for prolonged periods in the coating composition vehicle. In the present invention, on the other hand, treatment of the titanium pigment affords obtainment of a product which will meet all mix-in particle size and film particle count test requirements. The product thus becomes admirably suited for direct use and without any further milling in the vehicle as a mix-in pigment. For instance, by following the teachings set out herein, titanium pigments can be produced which never exhibit a mix-in pigment particle size value in excess of substantially 15 microns or a film particle count value in excess of about 60. Usually, this novel process produces titanium pigments exhibiting mix-in pigment particle size values not exceeding substantially 8 microns, and preferably not exceeding substantially 6 microns, with film particle count value not in excess of about 40 and preferably not in excess of about 25 and which may be incorporated in enamel paint vehicles by simple mixing, as in a pony mixer, to produce enamel paints which form films of smooth unbroken surface without any irregularities visible to the naked eye. This novel process allows the production of titanium pigments, particularly pigment titanium dioxide, which are finely divided to an extent heretofore unrealized by any commercially practicable prior art process or combination of processes, and which, without recourse to the paint milling operation required with prior art titanium pigments, may be incorporated in paint vehicles by simple mixing to produce paints which form films of smooth unbroken surface without any irregularities visible to the naked eye.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for the production of improved titanium pigments which comprises simultaneously and separately introducing into a reaction vessel a titanium pigment suspension, a water-soluble aluminum compound, and a precipitant for said aluminum compound, maintaining the concentration of titanium pigment in said mixture in the range of from about 10 to about 350 grams pigment per liter, maintaining the hydrated aluminum oxide concentration in said mixture in the range of from about 0.05% to about 10% calculated as $Al_2O_3$ and based upon the weight of the pigment, maintaining a substantially constant pH in said mixture in the range of from about 5 to about 8.5, and withdrawing the pigment suspension from the reaction vessel.

2. A process for the production of improved titanium pigments which comprises simultaneously and separately introducing into a reaction vessel a titanium pigment suspension, a water-soluble aluminum salt, and a precipitant for said aluminum compound, maintaining the concentration of titanium pigment in said mixture in the range of from about 10 to about 350 grams pigment per liter, maintaining the hydrated aluminum oxide concentration in said mixture in the range of from about 0.05% to about 10% calculated as $Al_2O_3$ and based upon the weight of the pigment, maintaining a substantially constant pH in said mixture in the range of from about 5 to about 8.5, and withdrawing the pigment suspension from the reaction vessel.

3. A process for the production of improved titanium pigments which comprises simultaneously and continuously introducing into a reaction vessel a titanium pigment suspension, a water-soluble aluminum compound, and a water-soluble basic precipitant for said aluminum compound, maintaining a substantially constant volume of the resultant mixture in said reaction vessel, maintaining the concentration of titanium pigment in said mixture in the range of from about 10 to about 350 grams pigment per liter, maintaining the hydrated aluminum oxide concentration in said mixture in the range of from about 0.05% to about 10% calculated as $Al_2O_3$ and based upon the weight of the pigment maintaining a substantially constant pH in said mixture in the range of from about 5 to about 8.5, and continuously withdrawing the pigment suspension from the reaction vessel.

4. A process for the production of improved titanium pigments which comprises simultaneously and continuously introducing into a reaction vessel a titanium pigment suspension, an aqueous aluminum sulfate solution, and a precipitant for said aluminum compound, maintaining a substantially constant volume of the resultant mixture in said reaction vessel, maintaining the concentration of titanium pigment in said mixture in the range of from about 10 to about 350 grams pigment per liter, maintaining the hydrated aluminum oxide concentration in said mixture in the range of from about 0.05% to about 10% calculated as $Al_2O_3$ and based upon the weight of the pigment, maintaining a substantially constant pH in said mixture in the range of from about 5 to about 8.5, and continuously withdrawing the pigment suspension from the reaction vessel.

5. In a process for the production of improved titanium pigments which comprises simultaneously and continuously introducing into a reaction vessel a titanium pigment suspension, an aqueous aluminum sulfate solution, and an aqueous sodium carbonate solution as a precipitant for said aluminum compound, maintaining a substantially constant volume of the resultant mixture in said reaction vessel, maintaining the concentration of titanium pigment in said mixture in the range of from about 10 to about 350 grams pigment per liter, maintaining the hydrated aluminum oxide concentration in said mixture in the range of from about 0.05% to about 10% calculated as $Al_2O_3$ and based upon the weight of the pigment, maintaining a substantially constant pH in said mixture in the range of from about 5 to about 8.5, and continuously withdrawing the pigment suspension from the reaction vessel.

6. A process for the production of improved titanium pigments which comprises simultaneously and continuously introducing into a precipitating tank a dispersed aqueous titanium oxide pigment suspension, a water-soluble aluminum salt, and a water-soluble basic precipitant therefor while maintaining a substantially constant volume of the resultant mixture in said precipitating tank, maintaining the concentration of titanium oxide pigment in said mixture at a substantially constant value in the range of from about 150 to about 250 grams pigment per liter, maintaining the hydrated aluminum oxide concentration in said mixture at a substantially constant value in the range of from about 0.1% to about 2% calculated as $Al_2O_3$ and based upon the weight of the pigment, maintaining a substantially constant pH in said mixture in the range of from about 5 to about 7.4, continuously withdrawing the pigment suspension from the precipitating tank, and thereafter dewatering and washing the resulting product, drying the resulting titanium oxide pigment at a temperature of not more than 200° C. and subsequently dry-milling the treated pigment.

7. A process for the production of improved titanium pigments which comprises simultaneously and continuously introducing into a precipitating tank a dispersed aqueous titanium oxide pigment suspension, an aqueous aluminum sulfate solution, and an aqueous sodium carbonate solution as a precipitant therefor while maintaining a substantially constant volume of the resultant mixture in said precipitating tank, maintaining the concentration of titanium oxide pigment in said mixture at a substantially constant value in the range of from about 150 to about 250 grams pigment per liter, maintaining the hydrated aluminum oxide concentration in said mixture at a substantially constant value in the range of from about 0.1% to about 2% calculated as $Al_2O_3$ and based upon the weight of the pigment maintaining a substantially constant pH in said mixture in the range of from about 5 to about 7.4, continuously withdrawing the pigment suspension from the precipitating tank, and thereafter dewatering and washing the resulting product, drying the resulting titanium oxide pigment at a temperature of not more than 200° C. and subsequently dry-milling the treated pigment.

8. A process for the production of improved titanium pigments which comprises simultaneously and continuously introducing into a precipitating tank an alkaline reacting dispersed aqueous pigment titanium oxide suspension, an aqueous solution of a water-soluble aluminum salt, and an aqueous solution of a water-soluble basic precipitant therefor while maintaining a substantially constant volume of the resultant mixture in said precipitating tank, maintaining the concentration of the pigment titanium oxide in said mixture at a substantially constant value in the range of from about 175 to about 225 grams pigment per liter, maintaining the hydrated aluminum oxide concentration in said mixture at a substantially constant value in the range of from about .25% to about 1% calculated as $Al_2O_3$ and based upon the weight of pigment, maintaining a substantially constant pH in said mixture in the range of from about 5 to about 6, continuously withdrawing the pigment suspension from the precipitating tank, filtering off and washing the resulting treated pigment, drying at a temperature of not more than 150° C., and thereafter drying-milling the dried treated pigment.

9. A process for the production of improved titanium pigments which comprises simultaneously and continuously introducing into a precipitating tank an alkaline reacting dispersed aqueous pigment titanium oxide suspension, an aqueous aluminum sulfate solution, and an aqueous sodium carbonate solution of a water-soluble basic precipitant therefor while maintaining a substantially constant volume of the resultant mixture in said precipitating tank, maintaining the concentration of the pigment titanium oxide in said mixture at a substantially constant value in the range of from about 175 to about 225 grams pigment per liter, maintaining the hydrated aluminum oxide concentration in said mixture at a substantially constant value in the range of from about .25% to about 1% calculated as $Al_2O_3$ and based upon the weight of the pigment, maintaining a substantially constant pH in said mixture in the range of from about 5 to about 6, continuously withdrawing the pigment suspension from the precipitating tank, filtering off and washing the resulting treated pigment, drying at a temperature of not more than 150° C., and thereafter dry-milling the dried treated pigment.

GEORGE R. SEIDEL.